UNITED STATES PATENT OFFICE.

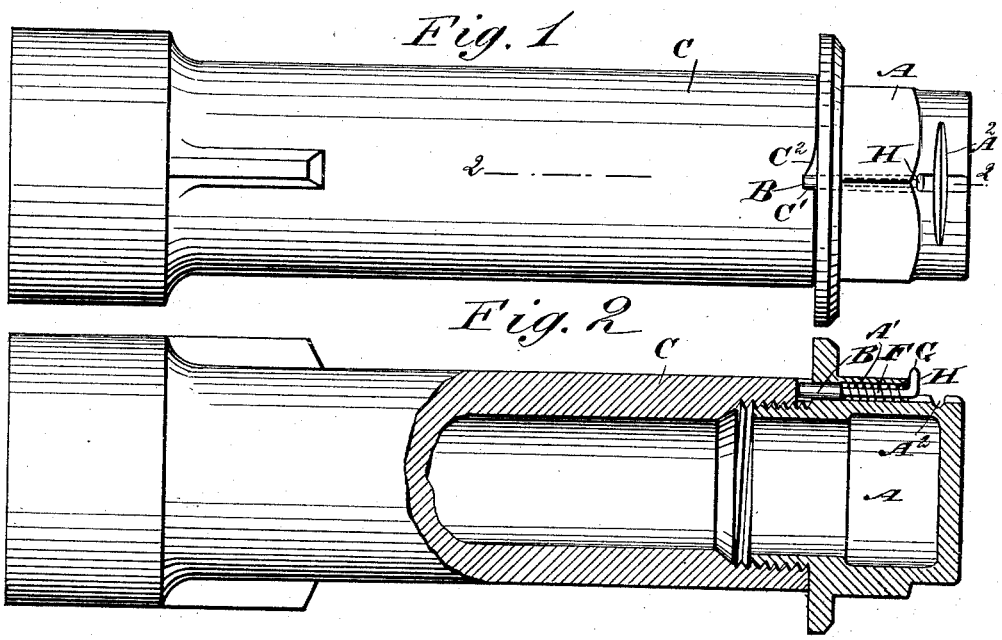

MICHAEL F. DEININGER, OF BROOKLYN, NEW YORK.

HUB-ATTACHING DEVICE.

SPECIFICATION forming part of Letters Patent No. 482,571, dated September 13, 1892.

Application filed May 20, 1892. Serial No. 433,676. (No model.)

*To all whom it may concern:*

Be it known that I, MICHAEL F. DEININGER, of Brooklyn, in the county of Kings and State of New York, have invented a new and Improved Locking Device for Carriage-Wheel Nuts, of which the following is a full, clear, and exact description.

The invention relates to nut-locks; and its object is to provide a new and improved device which is simple and durable in construction, very effective in operation, and more especially designed for securely locking the wheel-nut in place and arranged for conveniently unlocking the nut for removal of the same whenever desired.

The invention consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1 is a side elevation of the improvement as applied on the wheel-box. Fig. 2 is a longitudinal section of the same on the line 2 2 of Fig. 1.

The device for locking the wheel-nut A in place on the carriage-wheel consists principally of a spring-pressed pin B, arranged in the nut A, screwing on the end of the box C.

The pin B is fitted to slide in a recess A', formed in the nut A, and from the outer end of the pin extends outwardly the reduced shank F, on which is coiled a spring G, held in the recess A' and abutting with one end against the outer end of the said recess and with its other end against the outer end of the pin B, as will be readily understood by reference to Fig. 2, so that the pin B is by the spring G forced inward to engage with its inner end a notch C', formed in the end of the box C.

The notch C' is formed on one side with an incline C², extending from left to right, so that in screwing the nut A on the end of the box C the spring-pressed pin B will readily pass into the said notch C' and out of the same over the incline C², until the nut A is firmly screwed up against the end of the box C, a return movement of the nut being then prevented by the inner end of the pin abutting against the straight back of the notch C'.

In order to conveniently withdraw the spring-pressed pin B from the notch C' for unscrewing the nut A, the outer end of the shank F is formed with an arm H, extending approximately at right angles to the shank and being adapted to pass into a transversely-extending recess A², formed on the outside of the nut A, so that when the pin is withdrawn by the operator pulling on the arm H and then turning the latter until it passes into the recess A², then the pin B will be held in a locked position, the inner end of the pin then being out of engagement with the notch C', thereby permitting unscrewing of the nut A.

It will be seen that by this device the nut A can be conveniently screwed up into its proper place on the end of the hub D of the carriage-wheel, the nut then being locked in place by the spring-pressed pin to prevent accidental unscrewing of the nut. It will further be seen that the spring-pressed pin B can be conveniently actuated to unlock the nut A from the hub-box C to unscrew the nut for the removal of the wheel from the axle for greasing the latter or for other puposes.

The device shown and described is very simple and durable in construction, can be easily manipulated for removing the nut, as above described, is cheap to manufacture, and can be conveniently applied to all carriage-wheels now in use.

Having thus fully described my invention, I claim as new and desire to secure by Letters Patent—

1. The combination, with the hub-box C, provided with a notch C' in its outer end, of the nut screwing into the outer end of the box and provided with a spring-pressed locking-pin B, projecting at its inner end through its flange or shoulder into said notch and having an operating finger-piece to retract it, substantially as set forth.

2. A nut A for hub-boxes, having a threaded inner end, an annular external flange or shoulder, a squared portion outside of the flange, a longitudinal bore A', extending through the flange and the said squared portion, a transverse recess $A^2$ in the outer side of the nut beyond the outer end of the bore $A'$, and the spring-pressed bolt extending through the said bore with its end B projecting beyond the inner face of the flange and its outer end extending outward at right angles and adapted to enter the transverse recess and hold the bolt retracted, substantially as set forth.

MICHAEL F. DEININGER.

Witnesses:
JOSEPH T. O'NEILL,
JOHN A. RIPP.